United States Patent [19]
Padgett et al.

[11] Patent Number: 5,366,595
[45] Date of Patent: Nov. 22, 1994

US005366595A

[54] MOBILE APPARATUS FOR PYROLYZING CARBONACEOUS MATERIAL AND RELATED METHOD

[76] Inventors: Michael A. Padgett, 1550 Trent Blvd. Apt. 807, Lexington, Ky. 40515; Douglas B. Kuiper, 457 Winfield Pl., Lexington, Ky. 40517; Steven R. Rehnborg, 410 Willowbrook Dr., Winchester, Ky. 40391

[21] Appl. No.: 60,633

[22] Filed: May 11, 1993

[51] Int. Cl.$^5$ .................. C10B 53/00; C10B 1/10
[52] U.S. Cl. ............................ 201/19; 201/25; 201/30; 201/33; 202/83; 202/100; 202/105; 202/265; 585/241
[58] Field of Search ............ 201/4, 25, 33, 19, 30; 202/83, 105, 100, 265; 585/241

[56] References Cited

U.S. PATENT DOCUMENTS

| | | |
|---|---|---|
| 42,101 | 3/1864 | Mills ........................... 202/83 |
| 184,963 | 12/1876 | Harrison ...................... 201/33 |
| 1,373,702 | 4/1921 | Barr . |
| 3,449,213 | 6/1969 | Knapp et al. . |
| 3,843,457 | 10/1974 | Grannen et al. . |
| 3,926,582 | 12/1975 | Powell, Jr. et al. . |
| 4,065,361 | 12/1979 | Hanson . |
| 4,118,282 | 10/1978 | Wallace . |
| 4,732,092 | 3/1988 | Gould . |
| 4,826,573 | 5/1989 | Schippers . |
| 4,839,151 | 6/1989 | Apffel . |
| 4,980,029 | 12/1990 | Bolz et al. ................... 202/105 |
| 4,983,259 | 1/1991 | Duncan et al. ................ 202/83 |
| 5,082,534 | 1/1992 | Breu . |
| 5,084,140 | 1/1992 | Holland . |
| 5,084,141 | 1/1992 | Holland . |
| 5,102,503 | 4/1992 | Silinski et al. . |
| 5,174,107 | 12/1992 | Ogawa et al. . |

OTHER PUBLICATIONS

Paul T. Williams et al., "The Pyrolysis of Scrap Automotive Tyres The Influence of temperature and heating rate on product composition" (revised Jul. 30, 1990), all pages (pp. 1–8).

Primary Examiner—Joye L. Woodard
Attorney, Agent, or Firm—King and Schickli

[57] ABSTRACT

A loading mechanism places waste material into a porous rotatable cylinder that is mounted for relative rotation within an air-tight housing. Once loaded, the housing is sealed and oxygen is evacuated. A microwave heating device heats the waste material within the cylinder and breaks the waste material down into solid and fluid products. A drive motor simultaneously rotates the cylinder at high speed, creating centrifugal force on the waste material. The fluid products escape outwardly from the porous cylinder and are transferred to a heat exchanger chamber where they are cooled. A fractional distillation system stratifies the fluid products according to weight for purposes of recovery.

15 Claims, 4 Drawing Sheets

MOBILE APPARATUS FOR PYROLYZING CARBONACEOUS MATERIAL AND RELATED METHOD

TECHNICAL FIELD

The present invention relates to pyrolyzing carbonaceous waste material, especially waste tires, into solid and fluid components that are then processed to provide useful products while reducing waste material.

BACKGROUND OF THE INVENTION

The problem of waste tires accumulating has grown dramatically and now presents a significant environmental concern. Waste tires occupy a great deal of space in garbage dumps and landfills and constitute a contributing factor to a huge increase in generated waste that is causing the swelling of landfills. At present, over 230 million waste tires accumulate annually, with approximately 3 billion accumulated to date.

The proliferation of waste tires generated annually has given rise to a search for an efficient and clean method to reduce the volume of waste tires. One method investigated extensively is heating the tires sufficiently to break them down into solid and fluid components, a process known as pyrolysis. The benefits realized are two-fold. First, many of the solid and fluid components can be recovered after pyrolysis and recycled to produce useful products. Secondly, the volume of waste products resulting after pyrolysis that are not recyclable is much less than that of the original waste tires. This helps slow the swelling of landfills.

In many instances, however, pyrolysis of waste tires is not feasible because of excessive energy costs incumbent in raising the tires to a high temperature. These energy costs are generally greater than any benefit accruing from reducing the flow of waste products to a landfill or revenue produced from the pyrolysis products. In addition, there are high costs associated with the disposal of toxins produced during pyrolysis, further frustrating utilization of this method for reducing the volume of waste tires.

An attempted solution to the problem of high excessive energy costs is to pulverize the tires into small pieces to (1) fit more efficiently into a heating chamber and (2) increase the surface area exposed to the heat. This procedure is particularly utilized with standard convection heating pyrolysis apparatus wherein the heat is transferred to the tires from the outside surface inward.

Another attempt to reduce excessive energy costs associated with pyrolysis is to include a preheat section prior to the pyrolysis section to ease the heating requirements of the pyrolysis section.

More recent innovations in the pyrolysis of waste tires have resulted in faster and more efficient heating and break down into solid and fluid components. Specifically, microwave energy is applied to heat the waste material as opposed to convection heating. Microwave energy is applied uniformly throughout the tire materials to heat them more uniformly and rapidly than with convection heating. Microwave heating thus eliminates the need for the tires to be pulverized. U.S. Pat. Nos. 5,084,140, 5,084,141 and 4,839,151 disclose pyrolysis applications utilizing microwave energy.

Another recent innovation in waste material pyrolysis is the recycling of hot gases generated in the pyrolysis heating chamber into a preheat section. Subsequent waste material passes through the preheat section prior to the pyrolysis section and is preheated therein so that less heating, and less energy is required in the pyrolysis section. The heating efficiency utilizing the recycled hot gas is improved because less energy is required overall. The '141 patent demonstrates a pyrolysis assembly with hot gas produced during pyrolysis recycled into a preheat section. In addition, U.S. Pat. No. 3,926,582 discloses a pyrolyzing assembly wherein the hot gas produced is utilized to drive a generator to provide electric energy.

Another disadvantage of prior art pyrolysis apparatus is that they are permanently constructed on a particular site, so waste material must be transported to that site for processing. In instances wherein waste tires are found in numerous landfills extending over wide areas the cost of collecting and transporting the waste tires to the site of the pyrolysis apparatus is prohibitive.

SUMMARY OF THE INVENTION

Accordingly, it is a primary object of the present invention to provide an improved apparatus and related method for pyrolyzing carbonaceous waste material, such as waste tires, overcoming the above described limitations and disadvantages of the prior art.

Another object of the invention is to provide a more energy efficient apparatus for pyrolyzing waste material by reducing the energy input as heat necessary to effect pyrolysis.

It is yet another object of the present invention to provide an apparatus and method for pyrolyzing waste material, such as waste tires, wherein the waste material is rotated at high speed to produce a significant centrifugal force simultaneous with the heating of the waste material to assist in the pyrolysis process and make it more efficient.

It is another object of the present invention to provide a pyrolyzing apparatus wherein one of the useful products resulting from the pyrolysis of carbonaceous waste material is recycled as fuel to the device that supplies the heat necessary to pyrolyze the waste material.

It is another object of the present invention to provide a pyrolyzing apparatus for waste material requiring minimal assembly/disassembly facilitating transport on over-the-road trailers to a site of waste material.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, an apparatus and method for pyrolyzing carbonaceous waste material, such as waste tires, is provided. The waste material is efficiently pyrolyzed into solid and fluid components that are then recycled or disposed of in an environmentally acceptable manner. The efficiency of the pyrolysis process is improved in two specific ways. First, the waste material is simultaneously subjected to heating and centrifugal force, a combination found to require less energy to effect breakdown than heating alone. Second, the fluid components recovered from the waste material are separated into products, one of which is fuel that is recycled to supply the heating device.

In a first embodiment of the present invention, the pyrolyzing apparatus specifically includes an air-tight housing and means for evacuating oxygen from the housing. Pyrolysis of waste material can only occur in the absence of oxygen, since combustion occurs in the presence of oxygen. That results in burning of the waste material instead of the desired break down. An inner cylinder mounted within the housing is rotatable at high speed, preferably between 1000–4000 RPM, so that carbonaceous waste material retained in the cylinder is exposed to a significant centrifugal force. The waste material is also uniformly heated as a result of being rotated through the heat applied within the housing. Means for loading carbonaceous waste material into the cylinder and housing is provided for handling items such as waste tires. A heating means proximately mounted with respect to the housing applies the necessary heat raising the temperature of the waste material to approximately 1100°–1400° F. to pyrolyze the waste material into solid and fluid components. A process control means simultaneously controls both the high speed rotation of the inner cylinder and application of the heat to improve the overall efficiency of the process. Means for recovering the solid and fluid components resulting from the pyrolytic breakdown are also provided.

The inner cylinder within the housing is preferably porous to allow fluid components subjected to centrifugal force to escape outwardly while retaining solid components within. With the fluid components drawn off, the microwave energy is concentrated upon the solid components to produce the desired pyrolysis. In this way, the separation of fluid and solid components is facilitated and the efficiency of the process improved as a result.

The means for recovering the solid and fluid products preferably includes a heat exchanger chamber that receives and cools the fluid components. The recovering means also includes a fractional distillation system wherein the fluid components, communicated from the heat exchanger chamber, are separated through stratification into useful products such as oil, fuels and combustible gases. Gasoline used as vehicle fuel, fuel oil used to heat homes and supply industrial power plants, jet fuel, kerosene, methane gas and lubricants are some of the products resulting from this pyrolysis and fractional distillation of waste tire material. These products are then stored in a plurality of storage tanks. The recovering means also includes means for transferring the solid components remaining within the cylinder, such as steel belts and powdered carbon char, to recovery bins.

It is preferred that the source of power for at least the heating means be supplied by a combustion engine driving an electrical generator. The fuel for the engine is compatible with at least one of the useful fluid products recovered from the carbonaceous waste material. Thus, the waste material is recycled into electricity and used to pyrolyze subsequent waste material. The efficiency of the heating and of the entire process is significantly advantageously improved by recycling fuel in this manner.

In a second embodiment of the present invention a mobile apparatus for pyrolyzing waste material is provided requiring minimal assembly/disassembly. The mobile apparatus specifically includes an air-tight housing, means for loading waste material into the housing, and means for heating the waste material. Means for evacuating the oxygen from within the housing prior to heating is provided so that the pyrolysis occurs in an inert atmosphere. The mobile pyrolyzing apparatus also includes means for recovering the solid and fluid components. A power source is selectively applied by a process control means to operate the loading means, heating means, recovering means and evacuation means. The major elements of the apparatus are modular for quick assembly and disassembly and transportably mounted on a plurality of over-the-road trailers. The entire pyrolysis apparatus is thus quickly and easily transportable from one landfill to another or within a landfill, which sometimes cover a large land area, greatly reducing the cost of transporting waste material to the pyrolysis apparatus.

It is also preferred that the mobile pyrolyzing apparatus include a porous inner cylinder within the housing and drive means for rotating the cylinder to create the beneficial centrifugal force, described above, simultaneous with the application of the heating means.

The method of the present invention for pyrolyzing carbonaceous waste material includes the steps of (1) loading waste material into a porous inner cylinder of an air-tight housing, (2) evacuating oxygen from the housing, (3) simultaneously heating the waste material with microwave energy and rotating the cylinder at high speed and (4) recovering solid and fluid components produced.

The preferred inventive method also includes cooling the recovered fluid components in a heat exchanger chamber and subsequently separating the fluid components by stratification in a fractional distillation system. The solid components are separated with the useful solids being recovered, washed and put into a storage bin, and the waste solids falling into a disposal bin.

The preferred method also preferably includes recycling fuel recovered from the waste material to drive an engine/generator set providing electrical power to the microwave heating device.

Still other objects of the present invention will become apparent to those skilled in this art from the following description wherein there is shown and described the preferred embodiments of this invention, simply by way of illustration of two of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DETAILED DESCRIPTION OF THE INVENTION

Reference will now be made in detail to the present preferred embodiments of the invention, examples of which are illustrated in the accompanying drawings.

Figure 1:
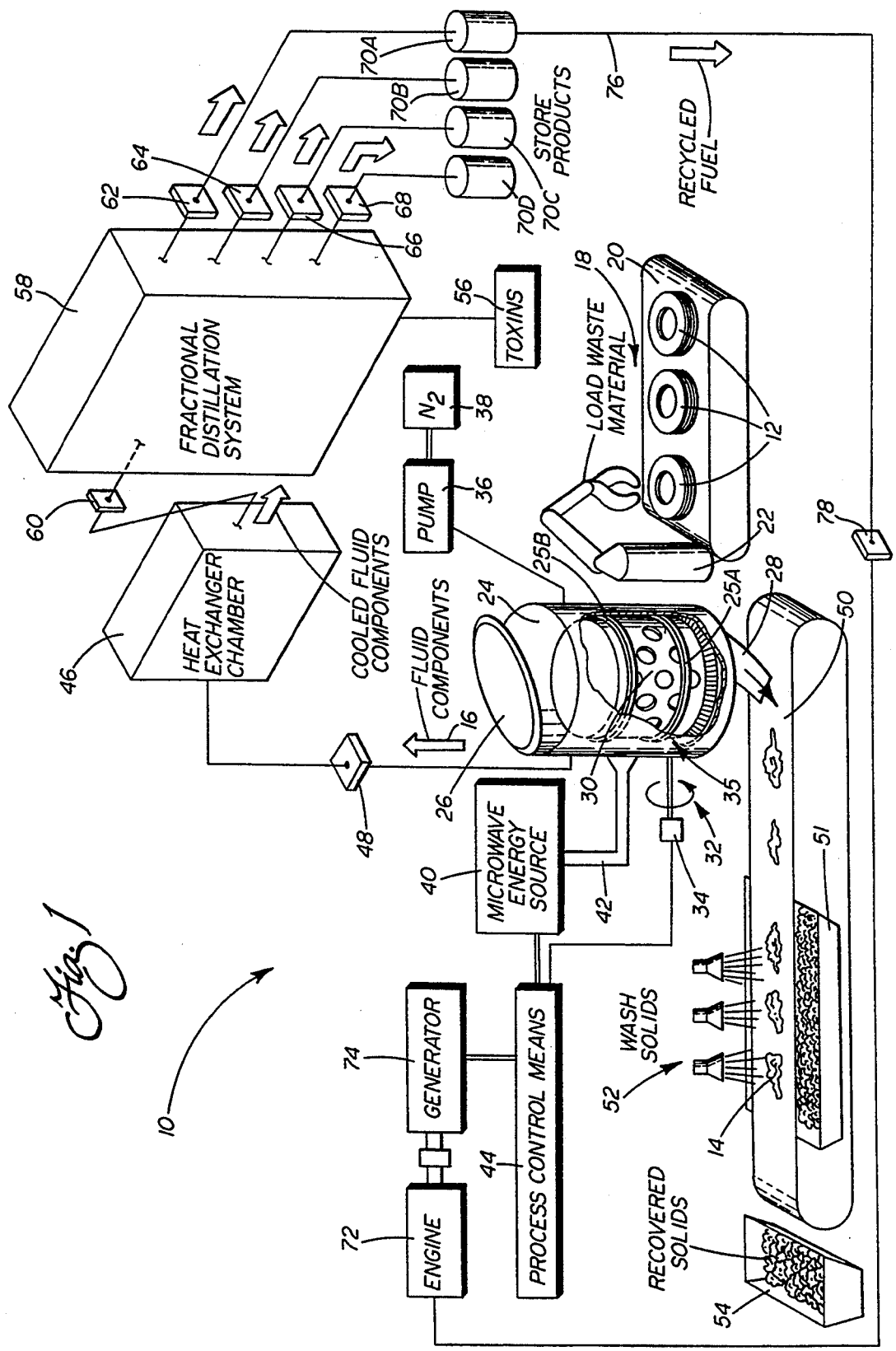
FIG. 1 is a schematic view of the pyrolysis apparatus showing important apparatus features and demonstrating the flow of fluid and solid components after pyrolysis.

Reference is now made to FIG. 1 schematically illustrating a pyrolyzing apparatus 10 for breaking down carbonaceous waste material 12, such as waste tires. The waste material 12 is broken down into solid components 14 and fluid components 16 that are then recovered, processed and either recycled, stored or disposed of in an environmentally safe manner. In the case of waste tires 12, typical solid products 14 include steel and powdered carbon char and typical fluid products 16 include oil and various hydrocarbon gases. A loading means 18 is used to handle the waste material 12. Specifically, a conveyor 20 transports the waste material 12 to a position where it can be manipulated by a pick-and-place robot handler 22. The waste 12 is loaded into a housing 24 by the robot handler 22 where it will subsequently be broken down into solid and fluid components 14, 16.

The housing 24 is a sealable air tight enclosure having an operable lid 26, that may be opened to allow the introduction of waste material 12. The housing 24 also includes a bottom trap door 28 for releasing solid components retained therein after pyrolysis. A porous inner cylinder 30 is supported within the housing 24 by a lower guide bearing 25A and upper guide bearing 25B extending from the cylinder 30 that engage lower supports 27A and upper supports 27B mounted on the housing 24 (see FIG. 4). A bottom door 31 on the cylinder 30 is opened in conjunction with the housing bottom trap door 28, as shown in phantom in FIG. 4, to allow solid components 14 to fall out. The cylinder 30 is rotatable within the housing, driven by a high speed drive means 32 including a drive motor 34, and bevel gear pair 35.

After loading the waste material 12 into the cylinder 30 and sealing the lid 26, an evacuation pump 36 removes all gases, most importantly oxygen, from within the housing 24. In the preferred embodiment, after evacuation of the housing 24 nitrogen is injected from a supply tank 38 into the housing 24 so that the waste material 12 exists within an inert atmosphere.

A microwave energy source 40 is applied through waveguides 42 affixed to the housing 24 to heat the waste material 12 sufficiently to break it down into solid and fluid components. In a significant aspect of the present invention, the drive motor 24 rotates the inner cylinder 30 simultaneously with the application of the microwave energy source 40 to improve the efficiency of the pyrolysis process. A centrifugal force is created in the waste material 12 that aids the separation of the fluid and solid components because the fluid components 16 move outwardly through the porous inner cylinder 30 while the solid components 14 are retained therein. This provides an additional force of separation to break the molecular bonds in the waste material 12. In addition, rotating the waste material 12 provides for uniform heating by continuously changing the orientation of the waste material 12 relative to the microwave heating waveguides 42. A process control means 44 is provided that activates both the microwave energy source 40 and the drive motor 34, applying both simultaneously.

After the waste material 12 is sufficiently heated and centrifuged and separated into its fluid and solid components, the fluid components 16 are transferred to a heat exchanger chamber 46 wherein cooling and condensing occur. A control valve 48 is operated between the housing 24 and the heat exchanger chamber 46 to regulate the flow of fluid components therebetween.

Figure 4:
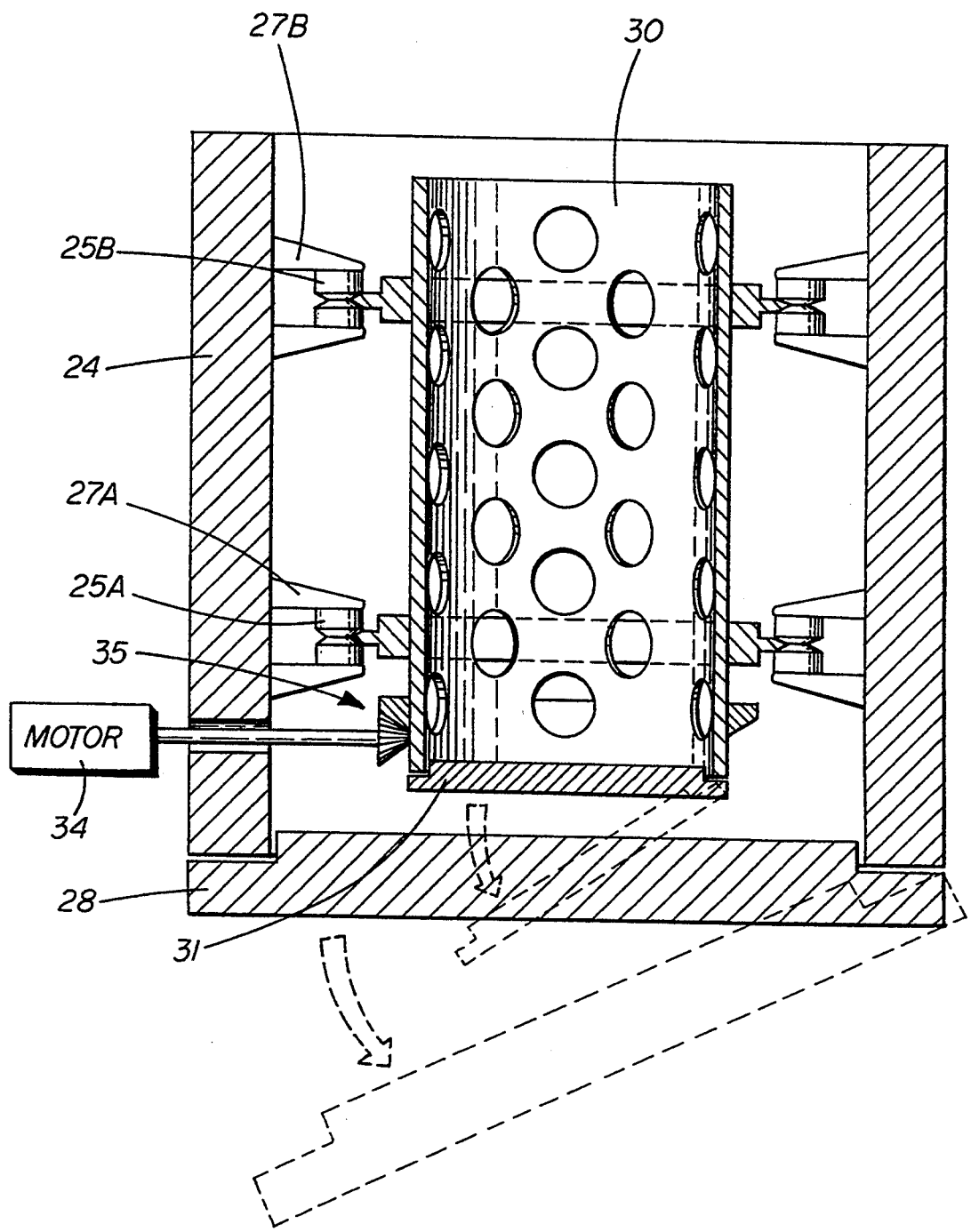
FIG. 4 is a sectional view of the inner cylinder supported within the housing.

The trap door 28 in the bottom of the housing 24 and door 31 on the bottom of the cylinder 30 are cooperatively opened to allow solid components 14 to drop out onto a porous discharge conveyor 50 (see FIG. 4). The solid components 14 are transported along the conveyor 50 through high pressure water sprays 52 that clean the solid components and force small solids, such as powdered carbon char, into a disposal bin 51 positioned below the conveyor 50. Larger solids, such as steel belts, are recovered by dumping into a solids storage bin 54.

The fluid components 16 produced during pyrolysis within the housing 24 are, upon entry to the heat exchanger chamber 46, still heated to an elevated temperature. Within the heat exchanger chamber 46 the fluid components 16 are cooled and condensed. During this condensation toxic components 56 are separated out and prepared for safe disposal. When the fluid components 16 have been sufficiently cooled they are transferred from the heat exchanger chamber 46 to a fractional distillation system 58 through a heat exchanger outlet control valve 60. Stratification of the fluid components occurs within the fractional distillation system 58, the heavier fluids, such as kerosene and jet fuel, forming at the bottom, and the lighter fluids, such as methane gas and fuel oil, forming at the top. Control valves 62, 64, 66, 68 tap into the various stratification levels and operatively transfer the various fluid products 16 in the fractional distillation system 58 into storage tanks 70A,B,C,D. Specifically, in the preferred embodiment methane gas is transferred through control valve 62, gasoline through valve 64, diesel fuel through valve 66, and fuel oil through valve 68. The storage tanks 70 thus are filled with fluid products 16 that are subsequently re-useable in other processes.

Power for all of the elements of the pyrolysis apparatus 10 is supplied by a combustion engine 72 coupled to an electrical generator 74. A main electrical feed 76 is fed to the process control means 44, which then distributes electric power to the various elements of the pyrolysis apparatus 10 such as the loading conveyor 20 and robot handler 22, the microwave energy source 40, the inner cylinder drive motor 34, the solids recovery or discharge conveyor 50, the evacuation pump 36 and all control valves 48, 60, 62, 64, 66, 68 regulating the flow of fluid components.

In a significant aspect of the present invention, the engine 72 driving the generator 74 receives methane gas recovered as one of the fluid products 16 and stored in a tank 70A. A recycle fuel line 76 between the methane storage tank 70A and the engine 72 is provided, controlled by a valve 78, so that methane gas is recycled to fuel the pyrolysis of subsequent waste material. This significantly reduces energy costs of processing to the significant advantage of the operator. Although not shown, it is contemplated that any of the other fuels recovered in the fractional distillation system 58 are suitable for use by a similar combustion engine.

Figure 2:
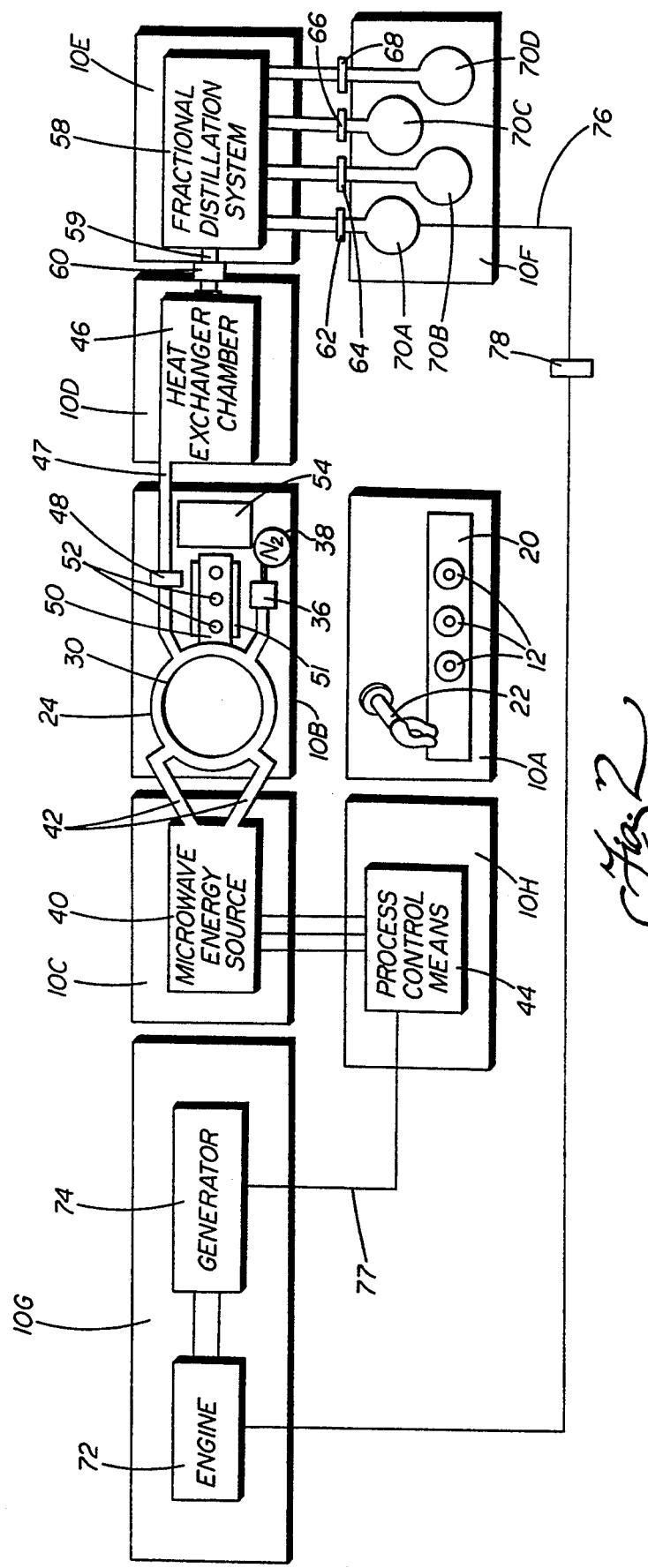
FIG. 2 is a top view of the mobile apparatus, all elements of the apparatus shown mounted on over-the-road trailers with quick assembly/disassembly means.
Figure 3:
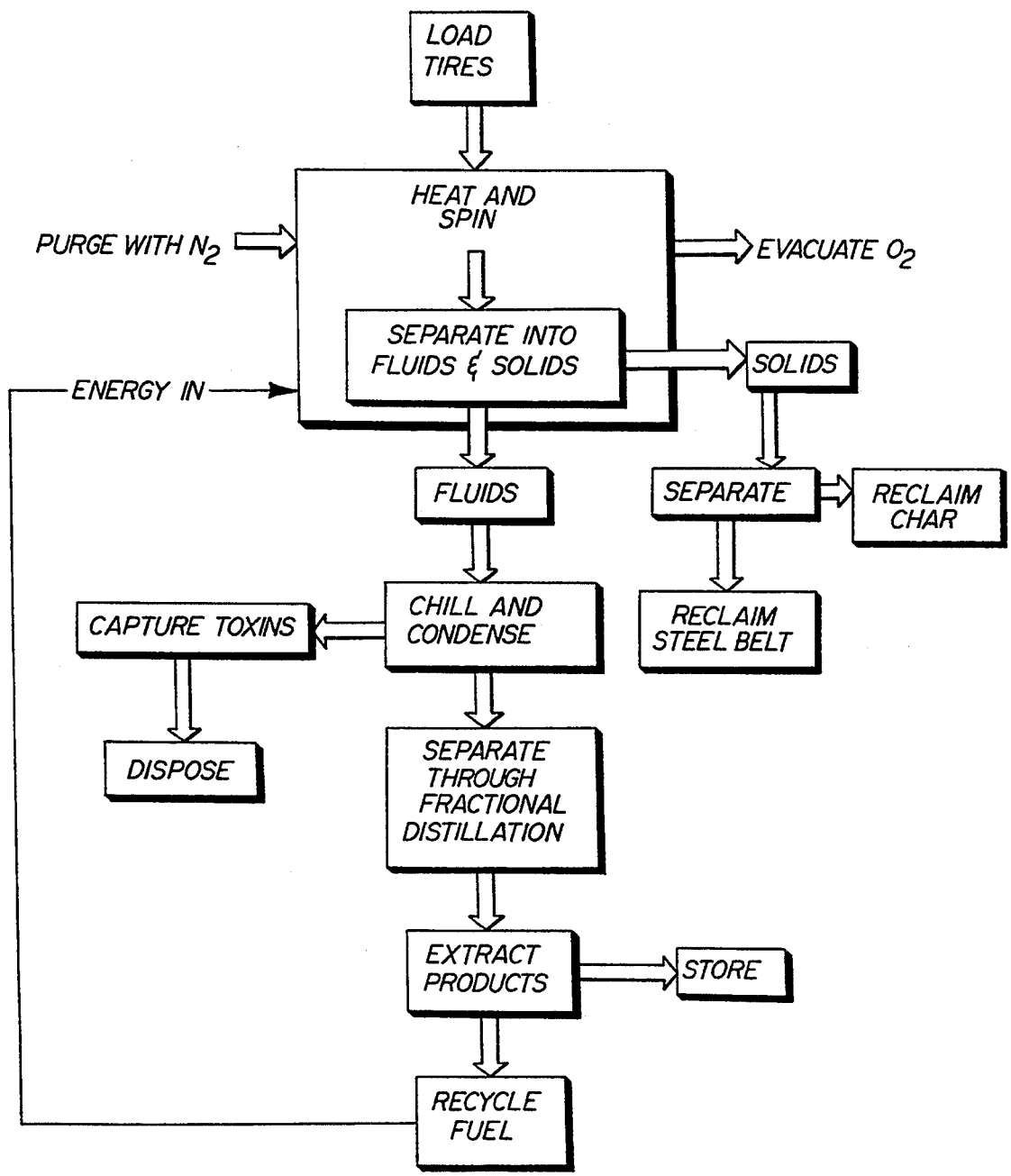
FIG. 3 is a process flow chart showing the multiple steps of the pyrolysis and recovery process and the flow of the fluid and solid components during the process.

Reference is now made specifically to FIG. 2 wherein a mobile pyrolysis apparatus 10 comprising various elements is shown mounted on a plurality of over-the-road trailers 10A–10H. Fluid flow, electrical, and structural connections between elements mounted on different trailers are shown connected although, during the over-the-road transport, such connections are interrupted. The connections shown allow quick and simple assembly/disassembly of the pyrolyzing apparatus 10 without requiring significant assembly or disassembly.

Specifically, the loading means 18 including the loading conveyor 20 and robot handler 22 are shown mounted on a trailer 10A properly positioned so that the robot handler 22 can pick-and-place waste material 12 from the conveyor 20 into the housing 24. Similarly, the housing 24, evacuation pump 36 and solid recovery conveyor 50 and bins 51, 54 are shown mounted on another of the trailers 10B. The microwave energy source 40 is mounted on one of the trailers 10C and connected through wave guides 42 to the housing 24. The wave guides 42 are quickly asserabled and disassembled to allow quick detachment of the two trailers 10B, 10C.

Recovery of the fluid products from the waste material 12 is performed by a heat exchanger chamber 46 mounted alone on one trailer 10D, a fractional distillation system 58 mounted alone on another trailer 10E, and storage tanks 70A, B, C, D mounted on another trailer 10F. The heat exchanger chamber 46 is in fluid communication with the housing 24, connected by a quick connect pipeline 47 including an in-line control valve 48. The output of the heat exchanger chamber 46 is similarly connected to the fractional distillation system 58 by quick connect piping 59 including control valve 60. Fluid products 16 recovered are transferred through control valves 62, 64, 66, 68 to a plurality of storage tanks 70A, B, C, D.

As discussed above, methane gas, gasoline, diesel fuel, and fuel oil are recovered from the fractional distillation system 58 any one of which is suitable for recycling through recycle flow line 76 to a combustion engine 72 that drives an electrical generator 74 supplying electrical power for the apparatus 10. The engine 72 and generator 74 assembly is mounted on another of the trailers 10G and is electrically connected to a process control panel 44 mounted on another trailer 10H by a quick connect main feed line 77. Power is selectively distributed and applied from the process control panel 44 to the microwave energy source 40, drive motor 34, conveyors 20, 50, and control valves 48, 60, 62, 64, 66, 68. Each electrical connection is made by a quick connect plug and receptacle arrangement.

In practicing the method of the present invention for pyrolyzing waste material 12 to produce solid and fluid products 14, 16, the first step is to load the waste material 12 into the housing 24 and porous inner cylinder 30. Loading is accomplished by conveying the waste tires 12 along the loading conveyor 20 to the robot handler 22. Next, the robot handler 22 places the waste material 12 into the cylinder 30 and returns to pick up additional waste material 12 from the conveyor 20. Once the cylinder 30 is loaded, the lid 26 is closed and an air-tight seal effected. Next, substantially all oxygen is removed from within the housing 24 so there is no combustion during pyrolysis of the waste material 12. The oxygen is evacuated using a pump 36, after which a gas supply 38 is applied to inject nitrogen or other inert gas into the housing 24.

The next step is to simultaneously heat the waste material 12 while rotating it at high speed. Simultaneous heating and spinning has the advantageous effects articulated above. In the preferred embodiment the cylinder 30 is rotated at approximately 3200 RPM while the waste material is being heated to a temperature of approximately 1320° F. As much as fifty pounds of material may be processed in as little as two to five minutes under these conditions.

When the waste material 12 is sufficiently heated/centrifuged to cause separation of the solid products 14 from the fluid products 16, the pyrolysis is complete. The fluid products 16 are then transferred from the housing 24 to a heat exchanger chamber 46. The solid products 14 are dropped out onto a porous solids recovery conveyor 50 where they are subsequently washed and separated, waste solids falling into a disposal bin 51 and useful solids being deposited into a recovery bin 54.

Cooling of the fluid components then occurs in the heat exchanger chamber 46 during which toxins 56 are separated out and disposed of in an environmentally acceptable manner. Next, the fluid components 16 are transferred from the heat exchanger chamber 46 to a fractional distillation system 58 where they are separated by stratification. The fluid products 16 are then recovered and put into storage tanks 70A,B,C,D for subsequent use or sale.

In a specific aspect of the present inventive method, one of the recovered fluid products, methane gas, gasoline, diesel fuel, and fuel oil is recycled from tanks 70A, B, C, D to a combustion engine 72 driving an electrical generator 74 that supplies the energy for subsequent pyrolysis. In this way, the pyrolyzing method is at least partially self-sufficient.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A method for breaking down carbonaceous waste material to produce solid and fluid products comprising the steps of:
   loading the waste material into a porous inner cylinder in an air-tight housing;
   sealing the housing;
   evacuating oxygen from the housing;
   heating the waste material in the housing/cylinder by applying microwave energy;
   rotating the cylinder at high speed simultaneously with said heating step;
   recovering solid and fluid products separated by pyrolysis during said simultaneous heating and rotating steps.

2. The method as set forth in claim 1 wherein the recovering step further includes the steps of:
   transferring the fluid products to a heat exchanger chamber;

cooling the fluid products in the heat exchanger chamber;

transferring the cooled fluid products to a fractional distillation system;

stratifying the fluid products in the fractional distillation system;.

extracting individual fluid products from said fractional distillation system;

storing the extracted, separated fluid products in storage tanks.

3. The method as set forth in claim 2 wherein said extracting and storing fluid products includes extracting and storing fuel.

4. The method as set forth in claim 3 further including the steps of:

providing a power source including a combustion engine driving an electrical generator to supply the electrical power for the microwave energy source;

recycling the extracted and stored fuel to the combustion engine.

5. The method as set forth in claim 1 wherein the heating step includes heating the waste material to a temperature between 1100° F. and 1400° F.

6. The method as set forth in claim 5 wherein the rotating step includes rotating the cylinder at a speed between 1000 RPM and 4000 RPM.

7. The method as set forth in claim 6 wherein the simultaneous heating and rotating steps are performed for between 2 and 5 minutes to effect complete pyrolysis.

8. An apparatus for breaking down carbonaceous waste material comprising:

an air-tight housing;

means for evacuating oxygen from said housing;

an inner cylinder mounted for relative rotation within and with respect to said housing;

means for loading the waste material into said cylinder;

rotary drive means operatively connected to rotate said cylinder at sufficiently high speed to create a centrifugal force on the waste material in said cylinder;

a microwave heating means proximately located with respect to said housing for heating the waste material in said cylinder;

control means operatively connected to said rotary drive means and said heating means whereby said waste material is simultaneously heated and subjected to centrifugal force to break down the carbonaceous waste material into solid and fluid products; and means for recovering said solid and fluid products.

9. The apparatus as set forth in claim 8 wherein said inner cylinder comprises a porous cylinder allowing fluid products subjected to centrifugal force to escape outwardly while retaining solid products therein.

10. The apparatus as set forth in claim 9 wherein said recovering means includes:

a heat exchanger chamber in controlled fluid communication with said housing wherein said fluid products are cooled;

a fractional distillation system in controlled fluid communication with said heat exchanger chamber wherein said fluid products are stratified and separated;

means for extracting fluid products from said fractional distillation system;

a plurality of storage tanks receiving said extracted fluid products;

at least one solids recovery bin;

means for transferring said solid products from said porous cylinder to said solids recovery bin; and means for washing said solid products positioned along said transferring means.

11. The apparatus as set forth in claim 10 further including a recycling power source supplying power to at least said heating means comprising:

a combustion engine;

an electrical generator driven by said combustion engine;

means for recycling said fluid products to said combustion engine.

12. A mobile apparatus requiring minimal assembly/disassembly for breaking down carbonaceous waste material comprising:

a plurality of over-the-road trailers;

an air-tight housing mounted on one of said trailers;

a porous inner cylinder within said housing;

means for loading carbonaceous waste material into said cylinder, said loading means mounted on at least one of said trailers;

a rotary drive means operatively connected to rotate said cylinder at high speed for creating a centrifugal force on waste material in said cylinder;

means for evacuating oxygen from said housing, said evacuating means mounted on one of said trailers and selectively operatively connected to said housing;

means for heating the waste material in said housing sufficient to effect breakdown of the waste material into solid and fluid products, said heating means mounted on at least one of said trailers and selectively operatively connected to said housing;

an electrical power generating means mounted on at least one of said trailers;

control means mounted on one of said trailers for selectively applying power from said power generating means to at least said heating means and said rotary drive means;

means for recovering said solid and fluid products of pyrolysis, said recovering means mounted on at least one of said trailers and selectively operatively connected to said housing to receive said solid and fluid products, whereby said mobile apparatus is quickly and easily transportable to and from a site of accumulated waste material.

13. The mobile apparatus as set forth in claim 12 wherein said recovery means includes:

a heat exchanger chamber mounted on at least one of said trailers and operatively connected to said housing to receive and cool said fluid products;

a fluid distillation system mounted on at least one of said trailers and operatively connected to said heat exchanger chamber for separating said fluid products through stratification according to weight;

means for removing and storing said stratified fluid products, said removing/storing means mounted on one of said trailers and operatively connected to receive said stratified fluid products therefrom;

means for recovering solid products from said cylinder, said solid recovery means mounted on one of said trailers and positioned to receive said solid products emitted from said cylinder.

14. The mobile apparatus as set forth in claim 13 wherein said stored stratified fluid products include a combustible fuel and said power generating means includes a combustion engine coupled to an electrical generator, said apparatus further including means for recycling said combustible fuel to said combustion engine.

15. The mobile apparatus as set forth in claim 14 further including structural interconnection means between said trailers.

* * * * *